Patented Nov. 23, 1948

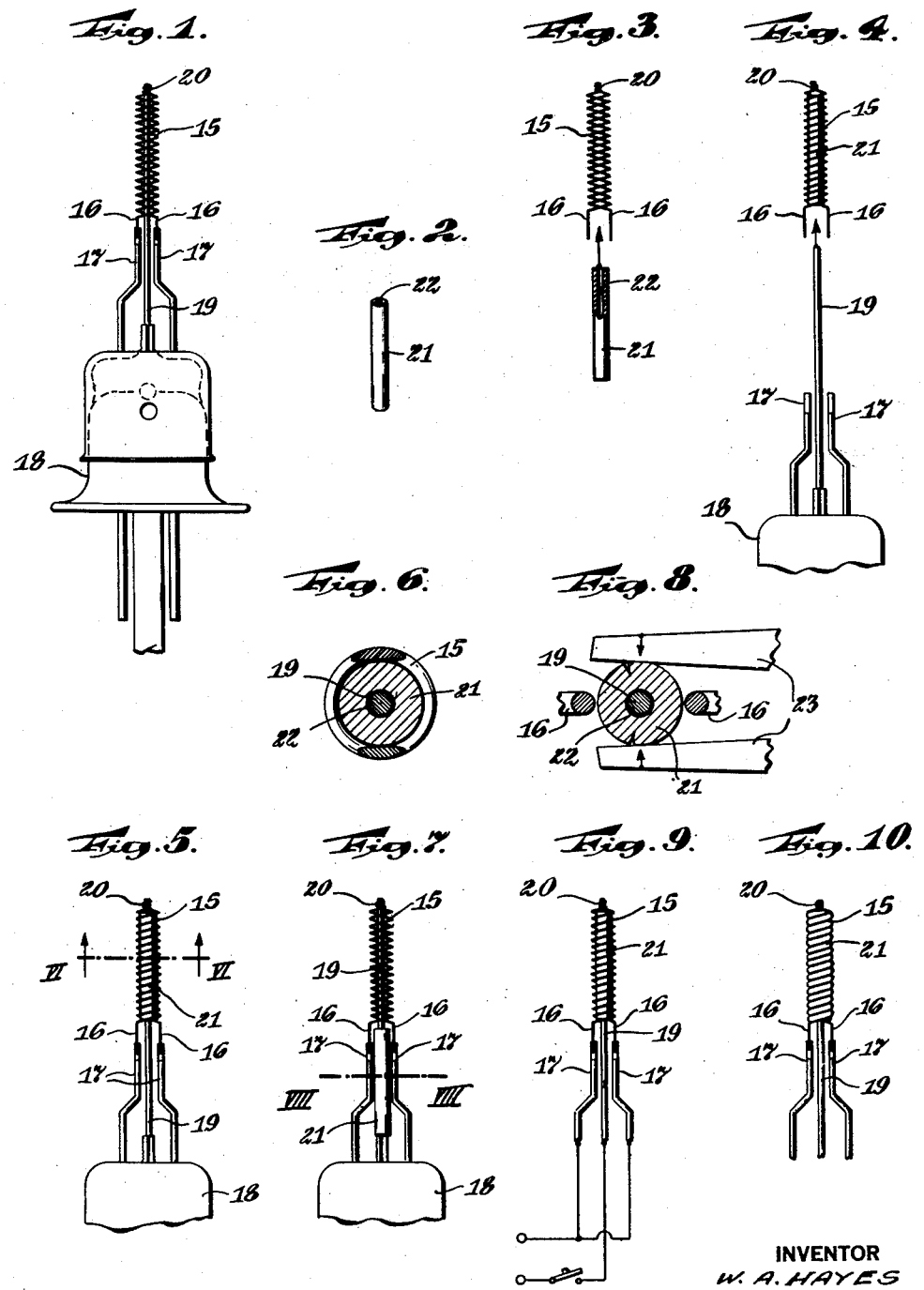

2,454,318

UNITED STATES PATENT OFFICE 2,454,318

METHOD OF FABRICATING ELECTRON DISCHARGE DEVICES

William A. Hayes, Kearny, N. J., assignor to Westinghouse Electric Corporation, East Pittsburgh, Pa., a corporation of Pennsylvania Application April 24, 1943, Serial No. 484,354

6 Claims. (Cl. 140—71.6)

This invention relates generally to the fabrication of electron discharge and analogous devices, and to the method of fabrication by use of a mandrel.

Heretofore during manufacture of electron discharge devices, a coiled filament, to be mounted in position, had to be supported around a longitudinally split tubular mandrel. After the ends of the filament were welded to the lead-in wires, the mandrel had to be slid, one section at a time, from within the coiled filament. This obviously was a very delicate operation, and even experienced operators would often bend or otherwise damage the filament. Furthermore, the welding of the filament ends to the lead-in wires was frequently performed so close to the mandrel, that the filament would become welded to the mandrel, and at best, the welding heat rapidly deteriorated the mandrel, thereby necessitating constant replacements.

The present invention contemplates overcoming these prior art difficulties and deficiencies.

Specifically, the invention has for its primary object an improved method by which a mandrel may be removed without injury to the coiled filament.

An object of prime importance is an improved method including the provision of an adequately strong but inexpensive mandrel which can be readily made and removed without endangering the filament or its alignment.

More in detail, an object of the invention is to provide an improved method utilizing a disintegrable mandrel, destruction whereof may occur without detriment to the filament.

Another object is to provide an improved, more rapid and better method of aligning filaments in electron discharge devices.

Still further objects of the invention will appear as the description progresses, both by direct recitation thereof and by inference from the context.

Referring to the accompanying drawing in which like numerals of reference indicate similar parts throughout the several views;

Figure 1 is an elevation of a filament mount complete and ready for application in place in and as part of an electron discharge device;

Figure 2 is a perspective view of the mandrel utilized in carrying out the method of the present invention;

Figure 3 is an elevational section showing the mandrel about to be inserted into the coiled filament;

Figure 4 is an elevation showing the mandrel in the filament and the filament about to be applied to the wires of the stem;

Figure 5 illustrates the filament mount completed but with the mandrel still in place;

Figure 6 is a magnified section on line VI—VI of Fig. 5;

Figure 7 shows the mandrel slid from the filament coil where it is accessible for disintegration;

Figure 8 is a magnified section on line VIII—VIII of Fig. 7 and showing one means of disintegration being applied thereto crushing the mandrel;

Figure 9 is another elevation of the mandrel within the coiled filament and indicating another means of disintegration effected by heat; and Figure 10 is a further elevation of the mandrel within the coiled filament and indicating another method of disintegration by swelling and softening the mandrel.

In the specific embodiment of the invention illustrated in said drawing, the reference numeral 15 designates a coiled filament having ends 16 for attachment, as by welding, to lead-in wires 17 projecting upwardly from the press of a stem 18. The stem is also provided with a long supporting post or rod 19 which projects between the lead-in wires axially through the coil of the filament, the upper end of the coil having a constricted terminal 20 to fit onto the end margin of the rod.

In order to locate the coiled filament very precisely coaxially around the rod, a mandrel 21, constituting a salient feature of the present invention is provided. This mandrel is substantially the length of the coil and is cylindrical with an outside diameter closely approximating the inside diameter of the coil so as to readily slide thereinto. Said mandrel is likewise provided with a longitudinal axial hole 22 therethrough of appropriate size to enable the mandrel to be slid onto the central rod 19 without excessive clearance so the mandrel will be precisely coaxial with the rod and will present a sufficient frictional engagement therewith to retain the mandrel in position against force of gravity tending to displace it.

As indicated in Figures 2 to 5, the mandrel 21 is slid into the coiled filament and then both of those parts are slid onto rod 19. The ends 16 of the filament will then be located in juxtaposition to the side faces of the ends of lead-in wires 17 to which they are then welded. Presence of the mandrel assures exact location of the coil around the rod coaxial therewith, and it next becomes necessary to remove the mandrel without disturbing the coaxial relation of coil and rod. Accomplishment of this desideratum constitutes the outstanding feature of the present invention.

According to my invention, the mandrel 21 is of a material which enables the same to be disintegrated from the supporting rod, and if desired, to be disintegrated from its position within the coil. The disintegration, however, is accomplished in a manner and by means having no adverse effects, mechanically, electrically, chemically or otherwise, on the filament or other elements constituting permanent parts of the mount or of the electron discharge device.

The invention accordingly contemplates use of a mandrel formed of material which is rigid and adequately strong for the use described of holding the filament in position until the filament is welded or otherwise secured, but of a material which can be very readily disintegrated. According to my discovery, a hardened mixture essentially of a paste or other plastic composition may be employed. Preferably the mixture employed is essentially flour and water commonly manufactured as an alimentary paste product and known as macaroni. That product is made in a plastic condition and allowed to dry for a considerable period until hard and rigid. Its manufacture is effected by extrusion from suitable dies forming the same with appropriate external diameter and interior longitudinal hole as above described. After considerable lengths are formed and dried, appropriate lengths for use as mandrels may be snipped off and employed without further treatment, although, if desired or necessary, the mandrels may be machined, ground or otherwise prepared for use.

Disintegration and elimination of the mandrel 21 may be effected in desired manner. For instance, the filament mount may be incorporated in an electron discharge device with the mandrel remaining in position within the coil as in Figs. 5 and 6 and said device passed through an oven or heated by induction while on the exhaust, either of which operations will raise the mandrel to such high temperature as to cause it to thermally decompose or burn with the gases and ash removed by the normal exhausting process to which such devices are subjected.

Alternatively, as indicated in Figures 7 and 8, the mandrel may be slid down the supporting rod 19 to a position below the coil where it can be crushed, as by use of pliers or other jaws 23 for the purpose. In this event, the mandrel is crushed and removed before the mount is introduced into the envelope for the electron discharge device.

If desired, disintegration may be accomplished, as indicated by Figure 9, by applying an electric current to the lead-in wires and post and by heating the filament to an adequate temperature to thermally decompose or burn the mandrel completely away either before or after the filament mount is incorporated in the electron discharge device. Again, as indicated in Figure 10, the mandrel may be soaked in water or other fluid which causes the mandrel to swell and soften. Before it becomes too soft, it may be unscrewed so as to come to a bottom part of the rod with the filament acting as a screw thread for the unscrewing operation, and then, in view of the softened condition, the material comprising the mandrel is picked or broken or brushed away. If desired, the softening may be allowed to progress sufficiently while the mandrel is still within the coil that the softened material may be gently brushed directly from between the convolutions of the coil. Other means of removal may be followed, if desired, within the scope of the present invention.

It is also to be understood that while I prefer the particular plastic or paste product specifically referred to above, the invention is not limited in its broader aspects thereto. Other materials for accomplishing the purpose may be employed, such as the various thermosetting resins of the condensing type, and other materials such as wood, plaster, clay, glass and so forth may be used. Choice of disintegration steps by chipping, breaking, splitting, burning, thermally decomposing and immersion in water or other fluid is made to meet the requirements of material used and effect upon the filament and other permanent parts. Degree of fineness of ash, residue, chips or pieces may be varied to meet requirements and conditions of use. Air blast or exhaust suction may be employed, and brushing with hard or soft bristles used according to the situation of mandrel when brushed or the operator's skill in applying this means of disintegration. Chemical disintegration is contemplated in the category of fluid treatment. "Flashing" as one of the normal steps of tube manufacture is contemplated within the description of high frequency heating for disintegration purposes. In general, non-conducting materials, organic and inorganic, carbonaceous or otherwise thermally decomposable materials, and compounds which may be processed in desired form and adapted to be readily disintegrated mechanically, electrically, thermally or chemically to small pieces, chips, ash or residue or reduced by a solvent in whole or in part or removable by air or other fluid blast or flow or by exhaust without injury to permanent parts of the device, are contemplated within the above description of the invention.

I claim:

1. A method of manufacture of filamentary devices comprising mounting a coiled electrode on a destructively disintegrable unitary preformed hollow mandrel, applying a rod through the mandrel, welding said coiled electrode in place on said rod in said device while the coiled electrode and rod are held in spaced relation by said mandrel, destructively disintegrating the mandrel in place, and removing the product of disintegration from within the coil.

2. A method of manufacture of filamentary devices comprising mounting an electrode coil on a destructively disintegrable unitary preformed hollow mandrel with the ends of the coil substantially at the ends of the mandrel, applying a rod through the mandrel into supporting engagement with the end of the coil thereat, welding the other end of the coil to a lead-in wire fixed with respect to said rod while the coil and rod are held in spaced relation by said mandrel, destructively disintegrating the mandrel in place, and removing the product of disintegration from within the coil.

3. A method of manufacture of filamentary devices comprising mounting a coiled electrode on a unitary preformed hollow mandrel disintegrable to ash by application of decomposing heat thereto, applying a rod through the mandrel into supporting engagement with an end of the coiled electrode, welding the ends of the electrode in fixed relation to said rod while said electrode and rod are held in spaced relation by said mandrel, applying decomposing heat to said mandrel reducing the mandrel to ash, and removing the ash resulting from thermal decomposition of said mandrel.

4. A method of manufacture of filamentary devices comprising mounting a coiled electrode on a destructively disintegrable unitary preformed hollow mandrel, applying a rod through the mandrel, welding the ends of the coiled electrode in place in fixed relation to said rod while the coiled electrode and rod are held in spaced relation by said mandrel, supplying said coiled electrode with a heating current thermally decomposing said mandrel by heat from said coil and thereby destructively disintegrating said mandrel, and removing the decomposition residue of the destructively disintegrated mandrel.

5. In the manufacturing of a stem assembly having as a part of the completed assembly a tubular element, a supporting rod secured at one end to one end of said tubular element, and a supporting member secured to the other end of said tubular element, a method of manufacture comprising positioning a unitary preformed mandrel of destructively disintegrable material over said rod, disposing said tubular element on said mandrel, securing one end of said element to one end of said rod beyond the end of said mandrel, securing the other end of said element beyond the other end of said mandrel to said member, whereby said tubular element is secured in selected spaced relation to said rod, and destructively disintegrating said mandrel.

6. The method of mounting a tubular element in coaxial relation with a supporting rod, which comprises disposing a destructively disintegrable unitary preformed mandrel of selected wall thickness upon said rod, positioning over said mandrel a tubular element having an internal diameter fitting the outside diameter of said mandrel, securing one end of said tubular member to one end of said support rod beyond an end of said mandrel, and destructively disintegrating said mandrel.

WILLIAM A. HAYES.

REFERENCES CITED

The following references are of record in the file of this patent:

UNITED STATES PATENTS

| Number | Name | Date |
|---|---|---|
| 264,652 | Edison | Sept. 19, 1882 |
| 324,981 | Cabot | Aug. 25, 1885 |
| 786,257 | Beebe | Apr. 4, 1905 |
| 1,553,309 | Eisler | Sept. 15, 1925 |
| 1,634,528 | Wood | July 5, 1927 |
| 1,650,605 | Campbell | Nov. 29, 1927 |
| 1,163,329 | Edison | Dec. 7, 1915 |
| 1,771,927 | Ilingworth | July 29, 1930 |
| 1,904,105 | Van Liempt et al. | Apr. 18, 1933 |
| 1,962,350 | Kane | June 12, 1934 |
| 2,188,925 | Ronay | Feb. 6, 1940 |
| 2,269,081 | Feisner | Jan. 6, 1942 |
| 2,306,925 | Aicher | Dec. 29, 1942 |
| 2,320,700 | Kent et al. | June 1, 1943 |
| 2,353,961 | Knochel et al. | July 18, 1944 |

FOREIGN PATENTS

| Number | Country | Date |
|---|---|---|
| 462,306 | Germany | Dec. 14, 1924 |